(12) United States Patent
Lai et al.

(10) Patent No.: US 6,857,886 B2
(45) Date of Patent: Feb. 22, 2005

(54) ELECTRONIC CARD CONNECTOR

(75) Inventors: Jung Chieh Lai, Tu-Chen (TW); Chi-Ming Chen, Tu-Chen (TW)

(73) Assignee: Hon Hai Precision Ind. Co., Ltd., Taipei Hsien (TW)

( * ) Notice: Subject to any disclaimer, the term of this patent is extended or adjusted under 35 U.S.C. 154(b) by 0 days.

(21) Appl. No.: 10/659,543

(22) Filed: Sep. 9, 2003

(65) Prior Publication Data

US 2004/0248445 A1 Dec. 9, 2004

(30) Foreign Application Priority Data

Jun. 6, 2003 (TW) .................................... 92210434 U

(51) Int. Cl.⁷ ............................................. H01R 13/62
(52) U.S. Cl. ..................................................... 439/159
(58) Field of Search ................................ 439/152–160, 439/327, 607, 326

(56) References Cited

U.S. PATENT DOCUMENTS

| | | | |
|---|---|---|---|
| 6,071,149 A | * | 6/2000 | Hara .......................... 439/607 |
| 6,123,560 A | | 9/2000 | Hara et al. |
| 6,176,714 B1 | * | 1/2001 | Ishida et al. ................. 439/159 |
| 6,230,978 B1 | | 5/2001 | Koseki et al. |
| 6,290,136 B1 | | 9/2001 | Koseki et al. |
| 6,305,964 B1 | * | 10/2001 | Pon et al. .................... 439/327 |
| 6,368,124 B1 | | 4/2002 | Wang |
| 6,406,311 B1 | * | 6/2002 | Yu .............................. 439/159 |
| 6,413,106 B1 | | 7/2002 | Yu |

* cited by examiner

Primary Examiner—Alex Gilman
(74) Attorney, Agent, or Firm—Wei Te Chung

(57) ABSTRACT

An electronic card connector (1) for being mounted onto a printed circuit board includes a terminal module (2) and a card ejection mechanism (4) located at a side of the terminal module (2). The terminal module includes a dielectric housings (20) and a number of terminals (21) retained in the dielectric housing. Each terminal includes a contact portion (211) for electrically connecting with an electronic card and a mounting portion (212) for electrically connecting with the printed circuit board. The card ejection mechanism includes a push rod (41) and a button (42), the push rod and the button have a receiving space (424) and a locking portion (410) locking each other.

7 Claims, 5 Drawing Sheets

ELECTRONIC CARD CONNECTOR

BACKGROUND OF THE INVENTION

1. Field of the Invention

The present invention relates to an electronic card connector, and particularly to an electronic card connector having a card ejection mechanism.

2. Description of Related Art

Notebook computers are widely used for small volume thereof and convenience thereof for carrying. The limited space inside a notebook computer cannot accommodate too many devices and components, so the notebook computer is usually equipped with an electronic card connector for mating with various card, such as a memory card, an extended memory card and a hard disk, etc. However, each card mentioned above is inserted into the notebook computer fully or almost fully, so a large force is required to pull it out. In addition, the card has only a very little portion outside the notebook computer, so it is often difficult to manually grasp the card and pull it out of the notebook computer.

U.S. Pat. No. 6,290,136 discloses an electronic card connector with a card ejection mechanism for ejecting the card out of a notebook computer. The card ejection mechanism is disposed on one side of the electronic card connector and comprises a push rod, a guide attached to the push rod, a swing arm pivotably disposed in an inner face of a shield and a slide plate coupled with the swing arm. The push rod comprises a button which extends outside of the notebook when the electronic card connector is equipped on the notebook. As an operator exerts a force on the button, the electronic card is ejected out of the electronic card connector by the card ejection mechanism. However, the notebook is often configured with various profiles for matching various requirements of different people, so the button needs to be designed to match with the profiles of the notebook. Accordingly, the various electronic card connectors will often be newly designed and manufactured respectively only because of changes of the buttons, thereby increasing the cost of manufacture. To resolve the problem mentioned above, U.S. Pat. No. 6,406,311 discloses an electronic card connector with a card ejection mechanism. The card ejection mechanism comprises a push rod and a separate button extending outside of the notebook and assembled to the push rod by a peg, thereby we only need newly design and manufacture various buttons to match with the profiles of the notebook. However, it is sometimes laborious and troublesome to assemble the button to the push rod using the peg.

Hence, an improved electronic card connector is desired to overcome the disadvantage of the prior art.

SUMMARY OF THE INVENTION

An object of the present invention is to provide an electronic card connector having a card ejection mechanism with a separatable button which is apt to be assembled and may be designed with various profiles.

To achieve the above object, an electronic card connector in accordance with the present invention for being mounted onto a printed circuit board comprises a terminal module and a card ejection mechanism located at a side of the terminal module. The terminal module comprises a dielectric housing and a plurality of terminals retained in the dielectric housing. Each terminal comprises a contact portion for electrically connecting with an electronic card and a mounting portion for electrically connecting with the printed circuit board. The card ejection mechanism comprises a push rod and a button, the push rod and the button have a receiving space and a locking portion locking with each other.

Other objects, advantages and novel features of the invention will become more apparent from the following detailed description when taken in conjunction with the accompanying drawings.

DETAILED DESCRIPTION OF THE PREFERRED EMBODIMENT

Figure 1:
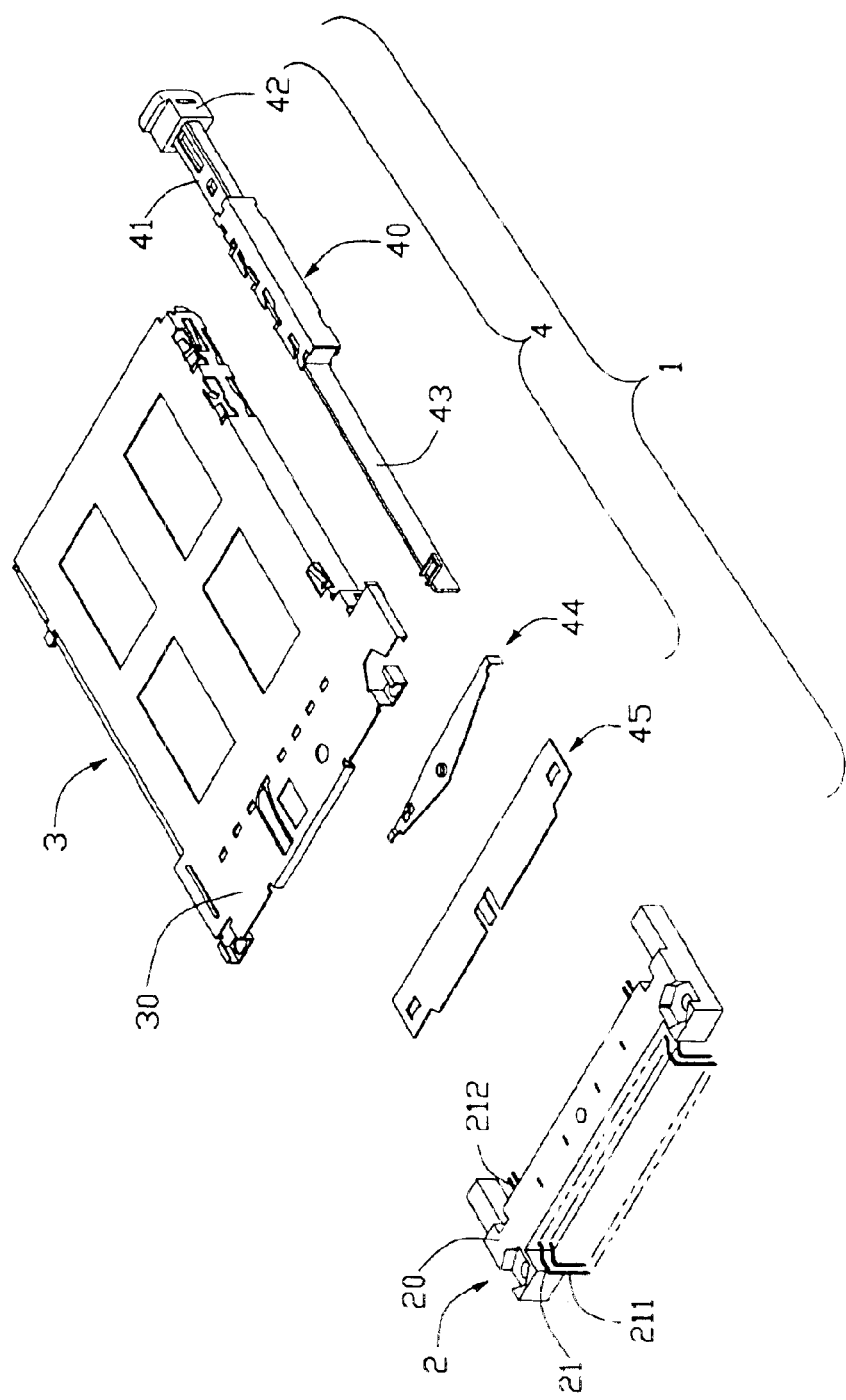
FIG. 1 is an exploded perspective view of an electronic card connector in accordance with the present invention.

Referring to FIG. 1, an electronic card connector 1 in accordance with the present invention comprises a terminal module 2, a shield 3 attached to the terminal module 2 with a front end 30 of the shield 3 covering a top face of the terminal module 2 and a card ejection mechanism 4 attached at a side of the shield 3. The terminal module 2 comprises a dielectric housing 20 and a plurality of terminals 21 retained in the dielectric housing 20. Each terminal 21 comprises a contact portion 212 for electrically connecting with an electronic card (not shown) received in the electronic card connector 1 and a mounting portion 211 for electrically connecting with a printed circuit board (not shown) which the electronic card connector 1 is mounted onto.

Referring to FIG. 1, the card ejection mechanism 4 comprises an operate portion 40 disposed at the side of the shield 3, a guide 43 attached to the operate portion 40, a swing arm 44 pivotably disposed to an inner face of the front end 30 of the shield 3 and a slide plate 45 coupled with the swing arm 44. When a force is exerted on the operate portion 41, the swing arm 44 rotates about an axis due to being driven by the guide 43, and then the slide plate 45 moves forwardly to push the electronic card out of the electronic card connector 1. The operation of the card ejection mechanism 4 is well known for one of ordinarily skill person in the pertinent art, so a detail description thereabout is omitted herein. Of course, in other embodiment the card ejection mechanism 4 can be directly disposed at a side of the terminal module 2 according to the pertinent art, such as U.S. Pat. No. 6,413,106.

Referring to FIG. 1, the operate portion 40 comprises a push rod 41 to which the guide 43 is attached and a button 42 assembled onto a distal end of the push rod 41.

Figure 2:
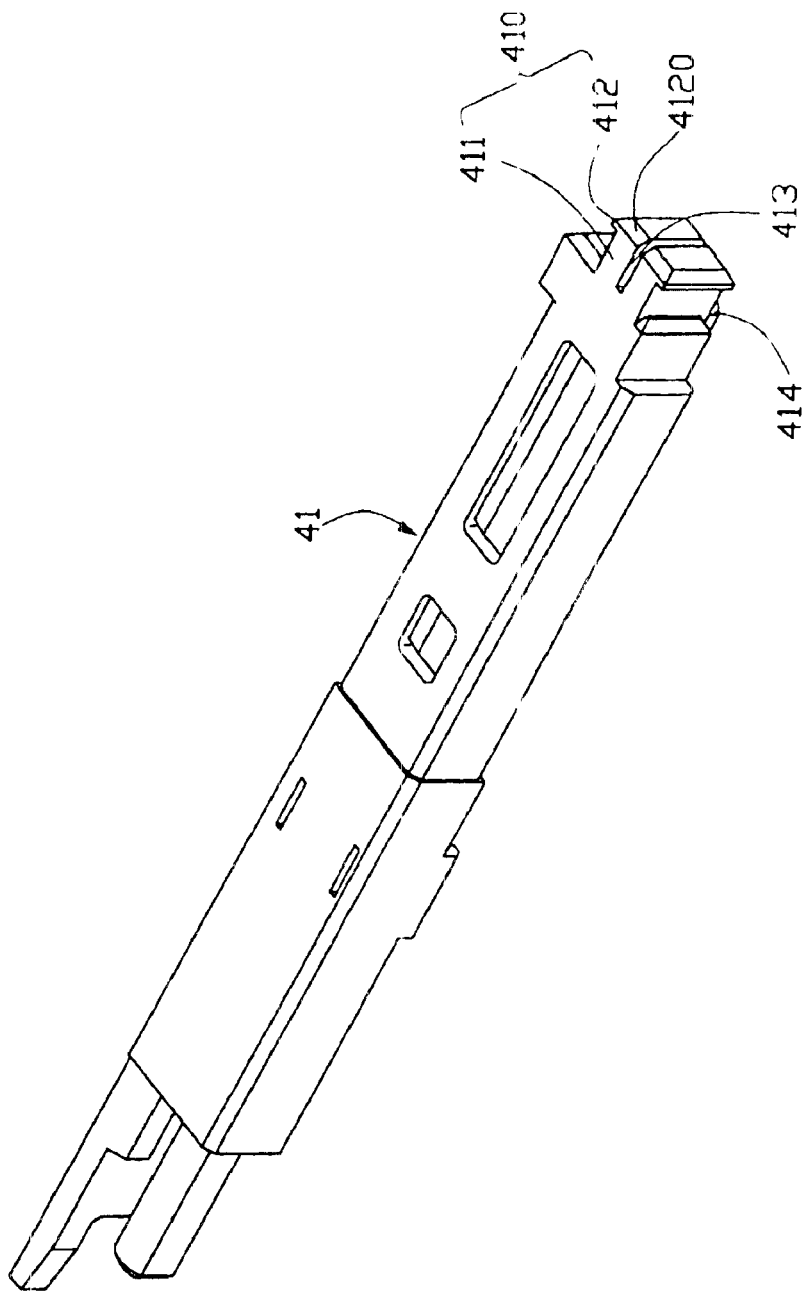
FIG. 2 is an enlarged perspective view of a push rod of the electronic card connector shown in FIG. 1.
Figure 3:
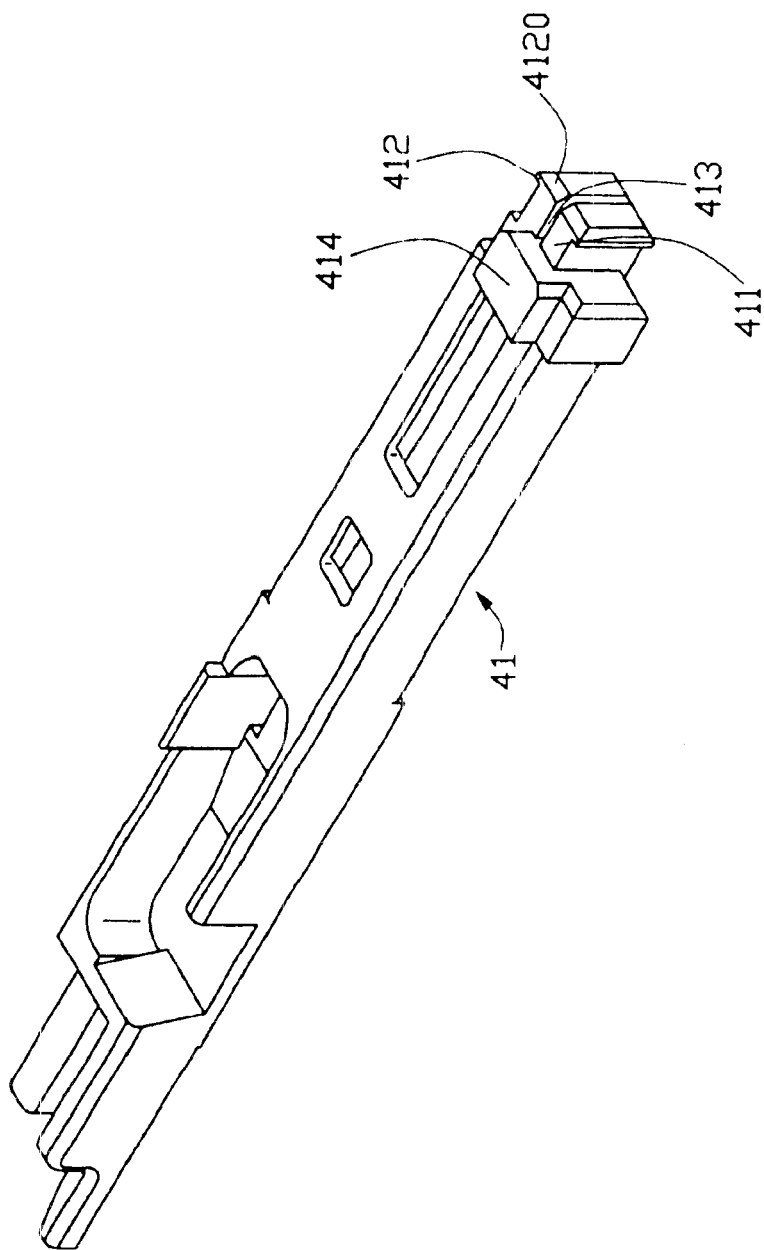
FIG. 3 is an enlarged perspective view of the push rod taken from another aspect.

Referring to FIGS. 2–3, the push rod 41 is formed with a locking portion 410 at the distal thereof. The locking portion 410 comprises a resilient portion 411 and a pair of hooks 412 extending laterally from opposite front edges of the resilient portion 411. A slit 413 is defined in the resilient portion 411 between the hooks 412 and separates the resilient portion 411 into a pair of symmetrical spring arms for providing the spring arms of the resilient portion 411 a space to flex. Each hook 412 defines a lead-in 4120 for facilitating the insertion of the locking portion 410. The locking portion 410 is formed with a projection 414 extending downwardly therefrom adjacent to the resilient portion 411.

Figure 4:
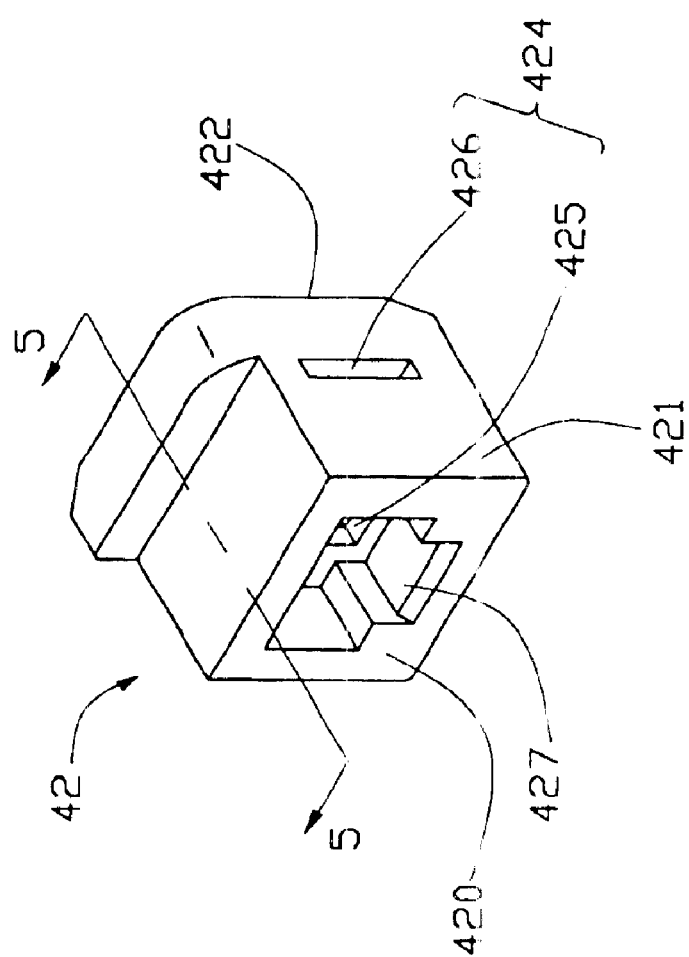
FIG. 4 is an enlarged perspective view of a button of the electronic card connector shown in FIG. 1.
Figure 5:
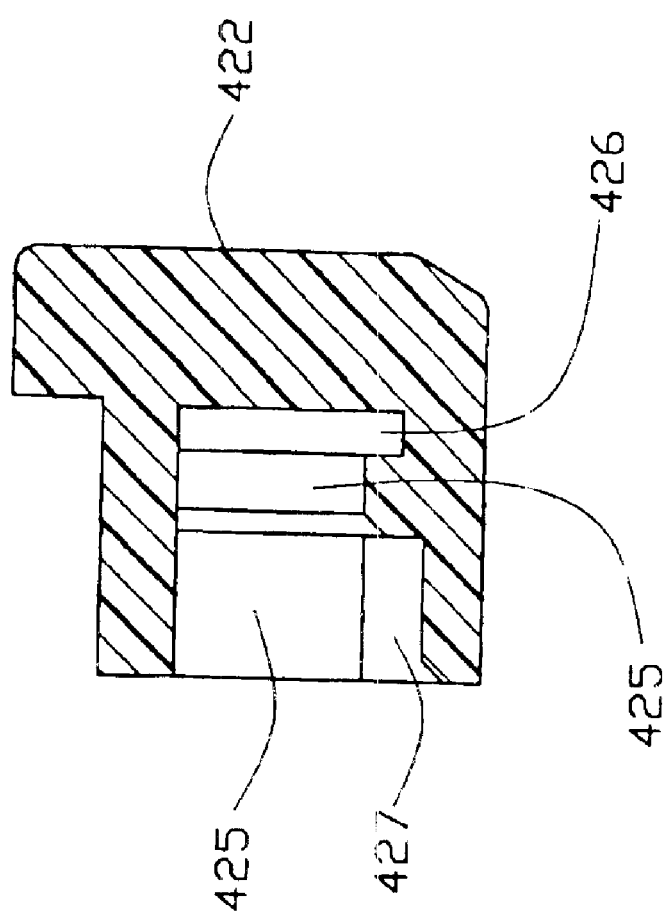
FIG. 5 is an cross-sectional view of the button taken along line 5—5 of FIG. 4.

Referring to FIGS. 4–5, the button 42 has an engaging face 420, a pair of opposite side faces 421 adjoining the engaging face 420 and an outer face 422 opposite to the engaging face 420. The button 42 defines a receiving space 424 therein. The receiving space 424 comprises a cavity 425 extending from the engaging face 420 toward the outer face 422, and a pair of recesses 426 extending laterally from a distal of the cavity 425 and passing through opposite side faces 421 respectively. The cavity 425 comprises a cutout 427 adjacent to the engaging face 420. One part of the button adjacent to the outer face 420 may extend outside a notebook which the electronic card connector is mounted on and be designed into various outlines to match with a profile of the notebook. In assembly, the resilient portion 411 of the push rod 41 is received in the cavity 425 with the hooks 412 locking with an inner wall of the corresponding recesses 426. The projection 414 is received in the cutout 427.

It is to be understood, however, that even though numerous characteristics and advantages of the present invention have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. An electronic card connector adapted for being mounted onto a printed circuit board comprising:

a terminal module comprising a dielectric housing and a plurality of terminals retained in the dielectric housing, each terminal comprising a contact portion adapted for electrically connecting with an electronic card and a mounting portion adapted for electrically connecting with the printed circuit board;

a card ejection mechanism being located at a side of the terminal module and comprising a push rod and a button, the push rod comprising one of a receiving space and a locking portion, the button comprising another of the receiving space and the locking portion, the locking portion comprising a resilient portion and a pair of opposite hooks laterally extending from a distal of the resilient portion, the resilient portion defining a slit between the hooks, the receiving space comprising a cavity and a recess communicating with the cavity; and wherein the hooks pass through the cavity with the resilient portion deflected toward the slit and snap back into the recess for establishing a securing connection between the button and the push rod, wherein there are a plurality of different buttons for use with said push rod, which have different outer contours while with the same connection structure thereof so as to comply with the different enclosures.

2. The electronic card connector as claimed in claim 1, wherein the locking portion is located on the push rod.

3. The electronic card connector as claimed in claim 1, wherein the hook defines a lead-in.

4. The electronic card connector as claimed in claim 1, wherein the locking portion is formed with a projection, and wherein the cavity comprises a cutout receiving the projection.

5. The electronic card connector as claimed in claim 1, further comprising a shield attached to the terminal module with a front end covering a top face of the terminal module.

6. The electronic card connector as claimed in claim 5, wherein the card ejection mechanism comprises an operate portion disposed at a side of the shield, and wherein the operate portion comprises the push and the button.

7. The electronic card connector as claimed in claim 6, wherein the card ejection mechanism comprises a guide attached to the push rod, a swing arm pivotably disposed in the shield and a slide plate coupled with the swing arm.

* * * * *